United States Patent [19]

Nitschke et al.

[11] Patent Number: 4,661,141
[45] Date of Patent: Apr. 28, 1987

[54] GLASS SHEET PRESS BENDING SYSTEM

[75] Inventors: Dean M. Nitschke, Maumee; David B. Nitschke; John S. Nitschke, both of Perrysburg; Harold A. McMaster, Woodville, all of Ohio

[73] Assignee: Glasstech, Inc., Perrysburg, Ohio

[21] Appl. No.: 839,797

[22] Filed: Mar. 14, 1986

[51] Int. Cl.[4] .............................................. C03B 23/02
[52] U.S. Cl. ......................................... 65/273; 65/104; 65/107; 65/287; 65/290
[58] Field of Search ................. 65/287, 289, 104, 290, 65/107, 273

[56] References Cited

U.S. PATENT DOCUMENTS

| | | | |
|---|---|---|---|
| 3,573,889 | 4/1971 | McMaster et al. | 65/273 X |
| 4,204,854 | 5/1980 | McMaster et al. | 65/273 X |
| 4,280,828 | 7/1981 | Seymour | 65/273 X |
| 4,297,118 | 10/1981 | Kellar et al. | 65/287 X |
| 4,575,390 | 3/1986 | McMaster | 65/107 |
| 4,604,124 | 8/1986 | Strauss | 65/287 |

*Primary Examiner*—Arthur Kellogg
*Attorney, Agent, or Firm*—Brooks & Kushman

[57] ABSTRACT

A glass sheet press bending system (20) disclosed has a bending station (30a,30b,30c,30d) for providing press bending between upper and lower molds (32,42) without intrusion into or through a conveyor (26) on which glass sheets are heated prior to the bending. The upper mold (32) is positioned above the conveyor (26), while the lower mold (42) is movable horizontally at an elevation above the conveyor from a first position adjacent the upper mold to a second position below the upper mold whereupon vertical movement therebetween performs the press bending between the molds. A transfer mold (48) receives the bent glass sheet from the upper mold (32) for cooling. Two embodiments of the bending station (30a,30c) have the lower mold continuously positioned within a heated ambient to provide a relatively hot lower mold that reduces breakage, while two other embodiments of the bending station (30b,30d) have the lower mold (42) movable out of the heated ambient after the press bending to provide a cooler mold that does not mark the glass sheets. Two embodiments of the bending station (30a,30b) have a lower mold (42) with a fixed curved shape, while the other two embodiments of the bending station (30c,30d) have a lower mold with first and second mold portions (60,62) that are movable with respect to each other to provide initial and final stages of the press bending operation. Each embodiment of the bending station has particular utility when utilized with a quench station (54) located on the opposite side of the heating conveyor (26) and the upper mold (32) as the lower mold (42) in its first position.

21 Claims, 15 Drawing Figures

GLASS SHEET PRESS BENDING SYSTEM

TECHNICAL FIELD

This invention relates to a glass sheet press bending system that has particular utility when used to provide tempered bent glass sheets.

BACKGROUND ART

Bent glass sheets are used extensively for vehicle windshields, side windows, and rear windows. To improve the mechanical strength of the glass, the bent glass sheets are also frequently tempered which additionally causes the glass to break into relatively small, dull pieces rather than into relatively long, sharp pieces. In the United States, tempered bent glass sheets are used on vehicle side and rear windows while annealed bent glass sheets laminated to each other by polyvinyl butyral are used for vehicle windshields. In other countries, tempered bent glass sheets are used for vehicle windshields as well as side and rear windows.

Glass sheet press bending is performed by pressing a heated glass sheet between complementary curved molds so that the heated glass sheet is bent to conform to the curved shape of the molds. One type of press bending system includes a horizontal conveyor on which glass sheets are conveyed in a generally horizontally extending orientation for the heating and also includes an upper mold that is located above the conveyor at a bending station. A lower mold is moved upwardly from below the conveyor to lift each heated glass sheet upwardly toward the upper mold for the press bending operation whereupon a vacuum is drawn at the upper mold to secure the glass sheet as the lower mold is moved downwardly. Thereafter, a transfer mold is moved horizontally under the upper mold and receives the press bent glass sheet for subsequent transfer therefrom. Normally, the transfer mold is formed as an open center ring and transfers the press bent glass sheet to a quench station where tempering is performed. This type of press bending system can be utilized with either a gas hearth or roller type conveyor. However, with a gas hearth conveyor where the glass sheets are conveyed on a thin film of pressurized gas, a groove has to be provided in the hearth to permit the lower mold to move downwardly below the conveyor so that the heated glass sheet can be conveyed over the lower mold in preparation for the upward movement of the lower mold for the press bending operation. Likewise, a roller conveyor utilizing this type of press bending system requires that the lower mold be of the segmented type so as to be movable upwardly between the spacings between the rolls and full engagement with the periphery of the glass sheet being pressed is thus not possible.

Prior art references disclosing the type of press bending system described above include U.S. Pat. Nos. 3,607,187; 3,607,200; 4,092,141; 4,260,408; 4,260,409; 4,265,650; 4,272,275; 4,290,786; and 4,430,110.

DISCLOSURE OF INVENTION

An object of the present invention is to provide an improved glass sheet press bending system that receives a heated glass sheet from a horizontal conveyor and provides press bending thereof between upper and lower molds prior to delivery to a transfer mold for cooling while performing the press bending without any intrusion of the lower mold into or through the horizontal conveyor as is the case with prior art press bending systems of this type.

In carrying out the above object, the glass sheet press bending system of the invention includes a furnace having a heating chamber for providing a heated ambient for heating glass sheets and also having a conveyor for conveying the heated glass sheets in a generally horizontally extending orientation. An upper mold of the system is located above the conveyor and has a downwardly facing curved shape. A vacuum drawn at the upper mold and upward gas flow from below the conveyor provide a preferred means for supplying a differential gas pressure to a heated glass sheet on the conveyor below the upper mold to support the glass sheet against the downwardly facing curved shape of the upper mold at a location above the conveyor. A lower mold of the system has an upwardly facing curved shape and is mounted for horizontal movement at an elevation above the conveyor from a first position adjacent the upper mold to a second position below the upper mold and the heated glass sheet supported by the upper mold. An actuator that moves the upper mold vertically provides a preferred means for providing relative vertical movement between the upper and lower molds to press bend the heated glass sheet between the upper and lower molds. A transfer mold of the system receives the bent glass sheet from the upper mold for horizontal movement therefrom for cooling in the bent shape.

In one preferred embodiment of the press bending system, the upper mold is located within the heated ambient at a location above the conveyor, and the lower mold is located within the heated ambient in both the first and second positions thereof to thereby maintain the lower mold heated in order to reduce glass breakage during the press bending. This embodiment of the system has particular utility when utilized with thin glass sheets and operations requiring longer press times, since the hot lower mold does not chill the glass sheet being bent in a manner that would otherwise be a problem with such bending operations.

In another embodiment of the press bending system, the upper mold is located within the heated ambient at a location above the conveyor while the lower mold is located outside the heated ambient in the first position thereof to provide cooling of the lower mold. During the press bending operation, the lower mold is moved into the heated ambient upon movement to the second position below the upper mold where the press bending is performed without marking the glass sheet due to the cooled condition of the lower mold. This embodiment of the press bending system incorporating the cooler lower mold has particular utility with thicker glass sheets and shorter press bending cycles where cooling of the glass sheet being bent is less of a problem than with thinner glass sheets and longer press cycles.

Both embodiments of the press bending system are disclosed in one version as having the lower mold provided with a fixed shape for press bending the heated glass sheet against the upper mold. A quench station also provided with each embodiment having the fixed shape lower mold is preferably located on the opposite side of the upper mold and the conveyor from the location of the lower mold in its first position. The transfer ring receives the bent glass sheet from the upper mold for movement to the quench station in a direction away from the lower mold while in its first position.

Two further embodiments of the system with both the hot or cool lower mold are each disclosed in another version as including a lower mold having first and second mold portions that are movable with respect to each other. The first mold portion of the lower mold initially presses the heated glass sheet against the upper mold to perform the initial press bending. An actuator of the lower mold subsequently moves the second mold portion of the lower mold with respect to the first mold portion thereof to complete the press bending of the heated glass sheet against the upper mold. In the embodiments disclosed herein, a pair of the second mold portions are provided located on opposite sides of the first mold portion and pivot with respect thereto to provide the subsequent press bending after the first mold portion provides the initial press bending. The actuator that moves each second mold portion is preferably located outside of the heated ambient and has a connection extending into the heated ambient to provide the lower mold operation.

Like the other embodiments with the fixed lower mold, the embodiments of the press bending system with the lower mold having first and second mold portions is also disclosed as including a quench station for providing tempering. Likewise, this quench station is preferably located on the opposite side of the upper mold and the conveyor from the lower mold in its first position such that the transfer mold moves the bent glass sheet from the upper mold to the quench station in a direction away from the lower mold while in its first position.

Adjustable stops are also preferably provided to limit the movement of the upper and lower molds toward each other during the press bending. Furthermore, with the embodiment having first and second lower mold portions movable with respect to each other, the actuator that moves the second mold portion with respect to the first mold portion is adjustable to control the movement of the second mold portion with respect to the first mold portion during the subsequent bending in order to provide best results.

In the most preferred construction, the press bending system has the upper mold thereof provided with a downwardly facing curved surface, and a gas jet pump of the upper mold draws a vacuum at the downwardly facing curved surface of the upper mold to provide at least some of the differential gas pressure that initially supports the heated glass sheet received thereby from the conveyor. As previously mentioned, upward gas flow such as from gas jet pumps located below the conveyor are also preferably provided to assist the gas jet pump of the upper mold in supporting the heated glass sheet received from the conveyor. A control of the gas jet pump of the upper mold is also provided for controlling the extent of vacuum drawn to reduce undesired deformation of the heated glass sheet. This control of the gas jet pump of the upper mold operates to: (a) initially draw a vacuum during lifting of the heated glass sheet from the conveyor to the upper mold; (b) thereafter reduce the vacuum to prevent undesired deformation with the glass sheet supported against the upper mold; (c) subsequently further control the vacuum as necessary during the press bending of the glass sheet between the upper and lower molds to assist in the bending while preventing undesired deformation as the press bending is performed; and (d) finally provide positive pressure gas to the upper mold to blow the bent glass sheet away from the upper mold in a downward direction.

The most preferred construction of the press bending system also includes the actuator previously mentioned for moving the upper mold downwardly to provide the press bending of the heated glass sheet against the lower mold after movement of the lower mold from its first position to its second position below the upper mold. An actuator of the lower mold provides the movement thereof between its first and second positions. Likewise, an actuator of the transfer mold provides movement thereof initially to below the upper mold to receive the bent glass sheet and thereafter away from the upper mold for cooling of the bent glass sheet. The latter actuator moves the transfer mold away from the upper mold to a lcoation between upper and lower blastheads of an associated quench station for the cooling when tempering is to be performed.

The objects, features, and advantages of the present invention are readily apparent from the following detailed description of the best modes for carrying out the invention when taken in connection with the accompanying drawings.

BEST MODES FOR CARRYING OUT THE INVENTION

Figure 1:
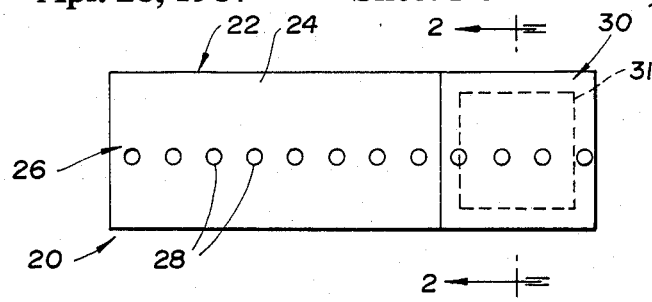
FIG. 1 is a schematic side view of a glass sheet press bending system constructed in accordance with the present invention.

With reference to FIG. 1 of the drawings, a glass sheet bending system generally indicated by 20 is constructed in accordance with the present invention and includes a furnace 22 having a heating chamber 24 for providing a heated ambient for heating glass sheets. A conveyor 26 of the system conveys the heated glass sheets in a generally horizontally extending orientation and preferably is of the roller type including rolls 28 that are frictionally driven in the manner disclosed by the U.S. Pat. Nos. 3,806,312; 3,934,970; 3,947,242; and 3,994,711. A press bending station 30 of the system 20 includes schematically indicated press bending apparatus 31 that provides press bending of heated glass sheets received from the conveyor 26 in accordance with the present invention as is hereinafter more fully described.

Figure 2:
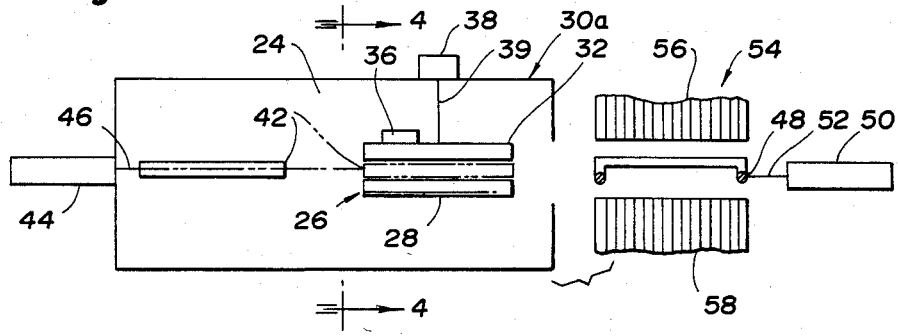
FIG. 2 is a sectional schematic view taken along the direction of line 2—2 in FIG. 1 and illustrates one embodiment of the press bending system wherein a lower mold thereof with a fixed curved shape is movable between first and second positions that are both within a heated ambient of the system.
Figure 3:
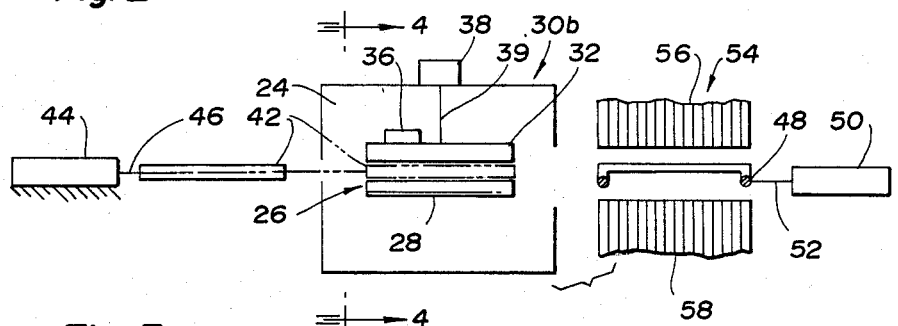
FIG. 3 is a schematic sectional view taken in the same direction as FIG. 2 through another embodiment of the press bending system wherein the lower mold with the fixed curved shape is movable into and out of the heated ambient.
Figure 4:
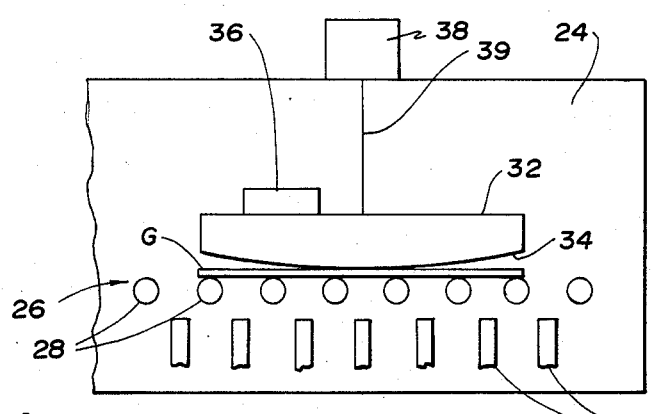
FIG. 4 is a schematic view taken along the direction of line 4—4 in either FIG. 2 or FIG. 3 and illustrates the manner in which an upper mold of the system is movable downwardly into proximity with a horizontal conveyor to receive a heated glass sheet therefrom in preparation for the press bending cycle.

With reference to FIGS. 2 and 3, two preferred embodiments 30a and 30b of the bending station are illustrated with each including an upper mold 32 located above the conveyor 26 and having a downwardly facing curved shape that is defined by a curved surface 34 as illustrated in FIG. 4. A gas jet pump 36 of the type disclosed by U.S. Pat. No. 4,222,763 provides a preferred means for supplying a differential gas pressure to a heated glass sheet on the conveyor 26 below the upper mold 32 to support the glass sheet against the downwardly facing curved shape of the mold at a location above the conveyor in the manner disclosed by U.S. Pat. No. 4,282,026. An actuator 38 of any conventional type such as an air cylinder has a connection 39 for moving the upper mold 32 vertically and initially moves the upper mold downwardly into proximity with the conveyor 26 as illustrated in FIG. 4 to facilitate the initial lifting of the glass sheet G from the conveyor into engagement with the lower mold surface 34 at which the vacuum is drawn by the gas jet pump 36. Gas jet pumps 40 of the type illustrated in U.S. Pat. No. 4,204,854 are also provided to supply upward gas flow between the conveyor rolls 28 to assist the vacuum drawn by the gas jet pump 36 in supplying the differential gas pressure that initially supports the heated glass sheet against the curved surface 34 of the upper mold. Actuator 38 then moves the upper mold 32 upwardly with the glass sheet supported thereby to the position of FIG. 5 spaced upwardly from the conveyor 26 in preparation for the continued press bending cycle.

Figure 5:
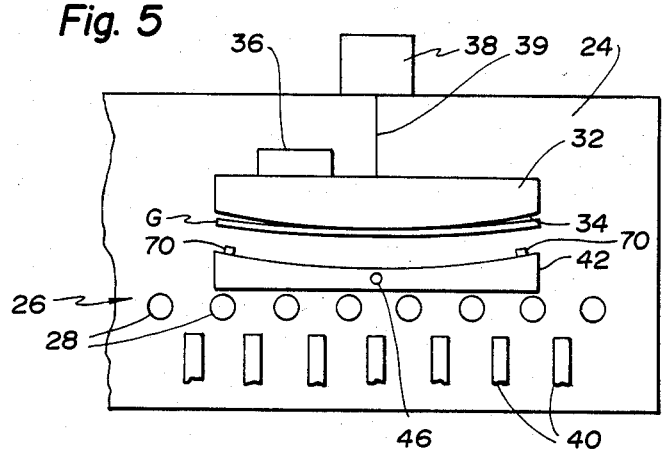
FIG. 5 is a schematic view taken in the same direction as FIG. 4 after the upper mold has been moved upwardly and the lower mold has been moved from a first position thereof at one side of the conveyor to a second position below the upper mold.

Each of the embodiments of the bending station 30a and 30b illustrated in FIGS. 2 and 3 includes a lower mold 42 that has an upwardly facing curved shape as illustrated in FIG. 5. Lower mold 42 is mounted for horizontal movement at an elevation above the conveyor 26 and is moved horizontally by an actuator 44 through a connection 46. Actuator 44 moves the lower mold 42 between a first position adjacent the upper mold at one side of the conveyor 26 as shown by solid line representation and a second position below the upper mold 32 as shown by phantom line representation which is below the heated glass sheet supported by the upper mold 32 as illustrated in FIG. 5.

Figure 6:
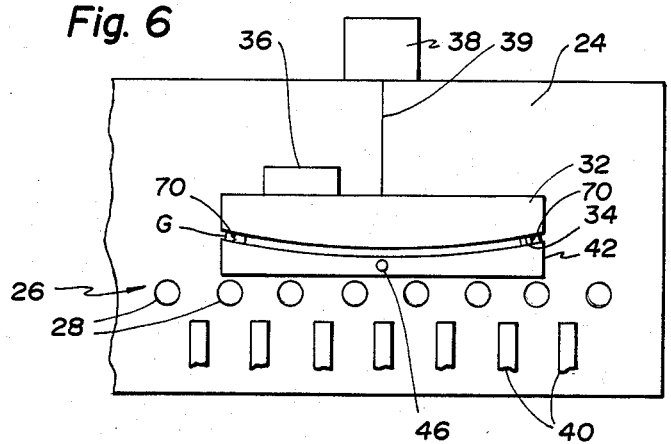
FIG. 6 is a schematic view taken in the same direction as FIG. 5 and illustrates the system after the upper mold has been moved downwardly to press bend the glass sheet against the lower mold.

With reference to FIGS. 5 and 6, the upper mold actuator 38 constitutes a preferred means for providing relative vertical movement between the upper and lower molds 30 and 42 by moving the upper mold downwardly to press bend the heated glass sheet therebetween to the curved shape of the molds. Thereafter, the upper mold 32 is moved upwardly by the actuator 38 to the position of FIG. 7 and the lower mold 42 is moved back to its first position as illustrated by solid line representation in FIGS. 2 and 3.

Figure 7:
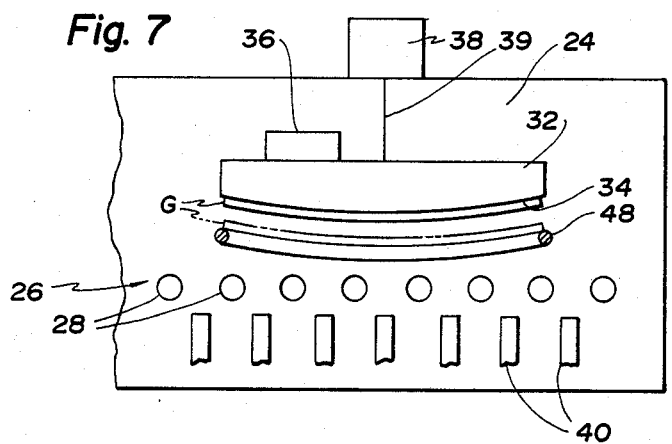
FIG. 7 is a schematic view taken in the same direction as FIG. 6 and illustrates the system after the upper mold has been moved upwardly out of engagement with the lower mold which is moved back to its first position to permit a transfer mold to be moved under the upper mold in order to receive the heated glass sheet therefrom as illustrated by phantom line representation.

A transfer mold 48 of each embodiment of the bending station 30a and 30b illustrated in FIGS. 2 and 3 has an actuator 50 with a connection 52 therebetween. This transfer mold 48 has a curved shape corresponding to the curved shape of the bent glass sheet and is positioned between the raised upper mold 26 as illustrated in FIG. 7 to receive the bent glass sheet therefrom as shown by phantom line representation. Thereafter, the actuator 50 moves the transfer mold 48 horizontally from below the upper mold 32 for cooling as is more fully hereinafter described.

With the bending station of the present invention as described above, press bending can be performed between the upper and lower molds 32 and 42 above the conveyor 26 without any intrusion of the lower mold into or through the conveyor as is the case with prior art press bending systems of this type. Thus, if the conveyor is of the gas hearth type, there is no need to provide a groove in the hearth corresponding to the peripheral ring shape of the glass sheet to be bent as is the case with prior gas hearth bending systems of the upper and lower mold type. Likewise, if the conveyor is of the preferred roller type like the conveyor 26 illustrated, there is no need for the lower mold to be of a split ring type as is the case with prior roller conveyor press bending systems of the upper and lower mold type. Rather, the upper and lower molds 30 and 32 can be constructed to provide whatever degree of engagement is desired to perform the press bending process without any regard to the conveyor on which the glass sheets are heated prior to being received by the upper mold.

As illustrated in FIG. 2, the embodiment of the bending station 30a has the upper mold 32 located within the heating chamber 24 so as to be within the heated ambient provided thereby at a location above the conveyor 26. The lower mold 42 of this embodiment is also located within the heating chamber 24 so as to be within the head ambient in both the first and second positions thereof as respectively illustrated by solid and phantom line representation. This continual positioning of the lower mold 42 within the heated ambient maintains the lower mold heated and has particular utility when used with thin glass sheets or longer press cycles to reduce glass breakage during the press bending. Also, the relatively hot lower mold 42 prevents chilling of the glass sheet that would inhibit subsequent tempering as is hereinafter more fully described.

As illustrated in FIG. 3, the embodiment of the bending station 30b also has the upper mold 32 located within the heating chamber 24 so as to be within the heated ambient provided thereby at a location above the conveyor 26. However, the lower mold 42 is located outside of the furnace heating chamber 24 and the heated ambient provided thereby in the first position thereof as illustrated by solid line representation so as to provide cooling of the lower mold between each press bending cycle. Actuator 44 moves the lower mold 42 into the furnace heating chamber 24 upon movement to the second position below the upper mold 32 where the press bending is performed. The press bending is performed without marking the glass sheet due to the cooled condition of the lower mold 42. This embodiment of the bending station 30b has particular utility when used to bend relatively thick glass sheets or with short press cycles where breakage and cooling of the glass sheet being bent is not as much of a problem as with thinner glass sheets or longer press cycles. It should be appreciated that with this embodiment, the furnace can advantageously be provided with a door that is opened and closed to permit the introduction and withdrawal of the lower mold into and out of the heating chamber without excessive heat loss.

As is apparent from the above discussions, the hotter lower mold of the embodiment of press bending station 30a is desirable from the standpoint of reducing glass breakage while the cooler lower mold of the embodiment of the press bending station 30b is desirable from the standpoint of reducing glass marking during the bending. These considerations must be balanced in determining which embodiment of the press bending system has most utility for any particular press bending operation.

The lower mold 42 of both embodiments of the bending station 30a and 30b illustrated in FIGS. 2 and 3 has a fixed curved shape as shown in FIG. 5 for performing the press bending against the upper mold 32 in the manner previously discussed. This fixed shape of the lower mold 42 is used with simpler bends that are not particularly difficult to press as compared to more difficult bends which are made by another version of the lower mold that is hereinafter described.

As shown in both FIGS. 2 and 3, both embodiments of the press bending station 30a and 30b are illustrated as including a quench station 54 to which the transfer mold 48 moves the bent glass sheet for tempering under the impetus of the actuator 50 through the connection 52. This quench station 54 may be of the type disclosed by U.S. Pat. No. 4,470,838 and includes upper and lower blastheads 56 and 58 through which quenching gas is supplied to provide the tempering. In this connection, the transfer mold 48 has an open center ring shape conforming to the periphery of the bent glass sheet in order to permit the quenching gas to impinge with both the upper and lower glass surfaces to perform the tempering. It will also be noted that the quench station 54 of both embodiments of the bending station 30a and 30b illustrated in FIGS. 2 and 3 is located on the opposite side of the conveyor 26 and the upper mold 32 as the lower mold 42 in its first position. Thus, the lower mold 42 and the transfer mold 48 move in opposite directions during movement thereof into position below the upper mold 32 during the press bending cycle as previously described. While the locations of the lower mold 42 and the transfer mold 48 with respect to the conveyor 26 and the upper mold 32 can be otherwise in accordance with the broadest application of the invention, the specific arrangement illustrated with the lower mold 42 and the quench station 54 on opposite sides of the conveyor 26 and the upper mold 32 has particular utility when tempering is to be performed.

Figure 8:
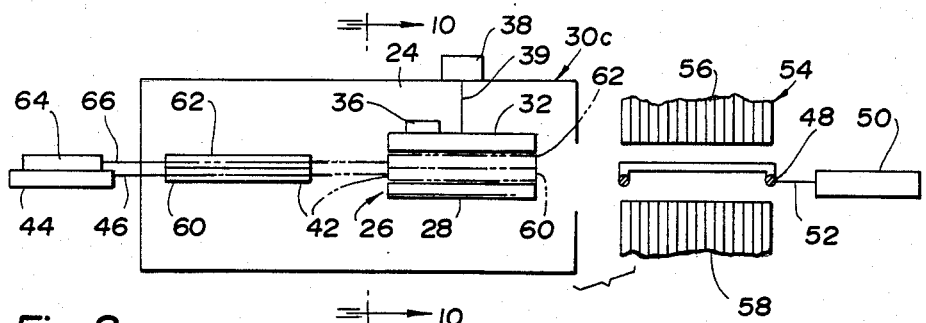
FIG. 8 is a schematic view of another embodiment of the press bending system wherein the lower mold is maintained within the heated ambient like the previously described embodiment of FIG. 2 but has movable mold portions as opposed to a fixed curved shape as with the previously described embodiments.
Figure 9:
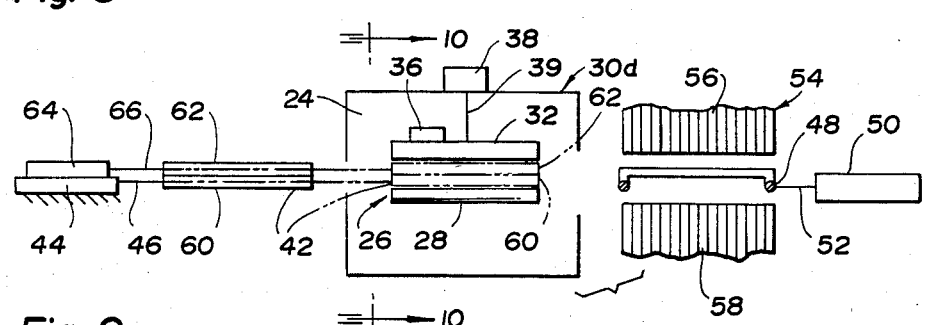
FIG. 9 is a schematic view of another embodiment of the press bending system wherein the lower mold like the embodiment of FIG. 3 is movable into and out of the heated ambient and like the embodiment of FIG. 8 has movable mold portions instead of a fixed curved shape.

With reference to FIGS. 8 and 9, two other preferred embodiments of the bending station 30c and 30d are also illustrated and are respectively similar to the previously described embodiments of the bending station 30a and 30b shown in FIGS. 2 and 3 except as will be noted. As illustrated in FIG. 8, the embodiment of the bending station 30c has its lower mold 42 moved between the first and second positions within the heated ambient provided by the furnace heating chamber 24 in the same manner as the previously described embodiment 30a to maintain the lower mold hot which is desirable when relatively thin glass sheets are being processed or longer press cycles are involved as previously discussed. The embodiment of the bending station 30d illustrated in FIG. 9 is similar to the embodiment 30b illustrated in FIG. 3 in that the lower mold 42 is moved out of the heated ambient provided by the furnace heating chamber 24 for cooling between the press bending cycles, which is desirable when thicker glass sheets and shorter press cycles are involved as was also previously discussed. As is hereinafter more fully described, the lower mold 42 utilized with the embodiments of FIGS. 8 and 9 includes first and second mold portions 60 and 62 that are movable with respect to each other. The first mold portion 60 initially presses the heated glass sheet against the upper mold during the press bending cycle. An actuator 64 having a connection 66 to the second mold portion 62 subsequently moves the second mold portion with respect to the first mold portion to complete the press bending of the heating glass sheet against the upper mold.

Figure 10:
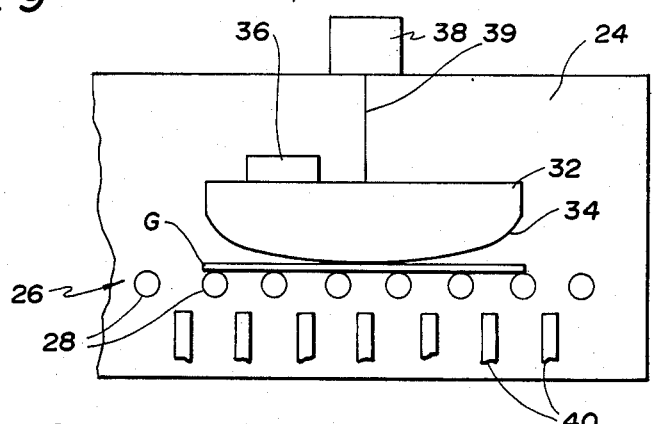
FIG. 10 is a schematic view taken along the direction of line 10—10 in either FIG. 8 or FIG. 9 and illustrates the manner in which an upper mold of the system is movable downwardly to a horizontal conveyor to receive a heated glass sheet therefrom in preparation for the bending operation.

Each of the versions of the bending station 30c and 30d illustrated in FIGS. 8 and 9 commences the press bending cycle in the same manner as the previously described embodiments. As illustrated in FIG. 10, the actuator 38 moves the upper mold 32 downwardly into proximity with the rolls 28 of the conveyor 26 to receive the heated glass sheet G as the vacuum drawn by the gas jet pump 36 and the upward gas flow provided by the lower gas jet pumps 40 provides support of the glass sheet against the upper mold. The differential gas pressure supplied to the heated glass sheet by the cooperable action of the gas jet pumps 36 and 40 also may provide a certain degree of forming of the glass sheet against the curved shape of the upper mold 32.

Figure 11:
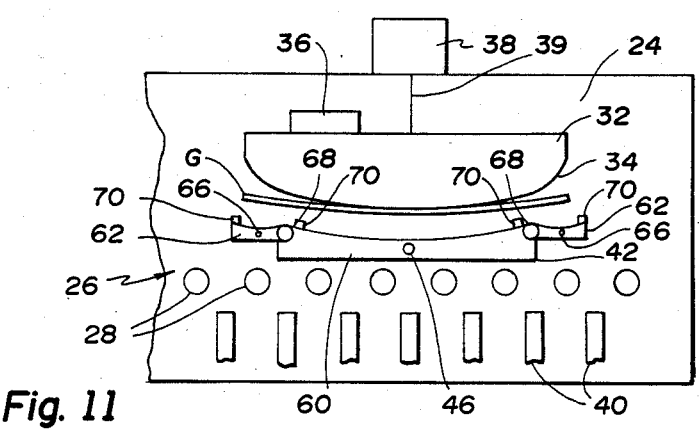
FIG. 11 is a view taken in the same direction as FIG. 10 after the upper mold is moved upwardly and the lower mold of the system is moved to below the upper mold in preparation for the press bending cycle.

As illustrated in FIG. 11, the press bending cycle proceeds as the actuator 38 moves the upper mold 32 upwardly and the actuator connection 46 moves the lower mold 42 to below the upper mold and the heated glass sheet supported by the upper mold. The illustrated construction of the lower mold includes a pair of the second mold portions 62 that are located on opposite sides of the first mold portion 60 and movable with respect thereto about pivots 68 under the operation of the actuator connections 66. In both embodiments illustrated in FIGS. 8 and 9, the actuator 64 that moves the second mold portions 62 with respect to the first mold portion 60 is located outside of the heated ambient provided by the furnace heating chamber 24 so as to avoid heat related problems, and each mold portion 62 is operated by an associated connection 66 to the actuator 64 to provide the movement thereof as previously described.

Figure 12:
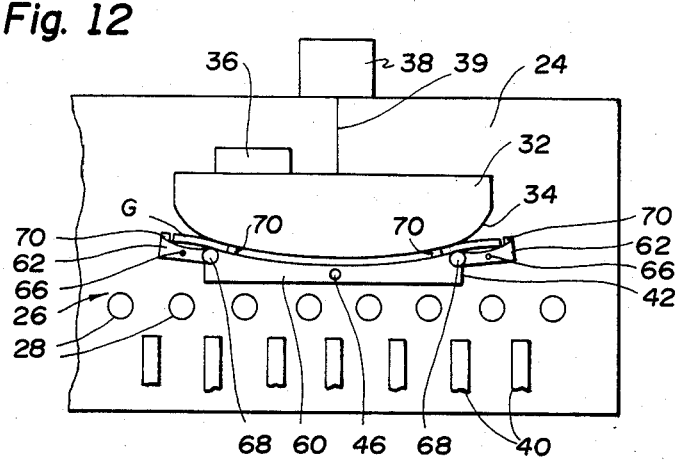
FIG. 12 is a schematic view taken in the same direction as FIG. 11 after the upper mold has been moved downwardly to press bend the glass sheet against a first portion of the lower mold.
Figure 13:
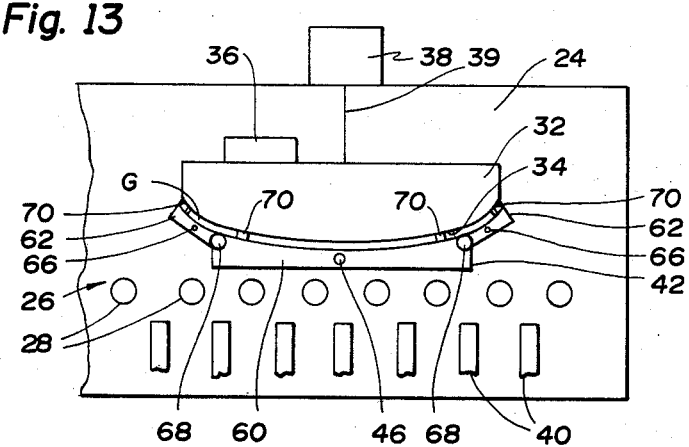
FIG. 13 is a view taken in the same direction as FIG. 12 after a pair of second portions of the lower mold have been moved with respect to the first portion thereof to provide further press bending of the glass sheet against the upper mold.
Figure 14:
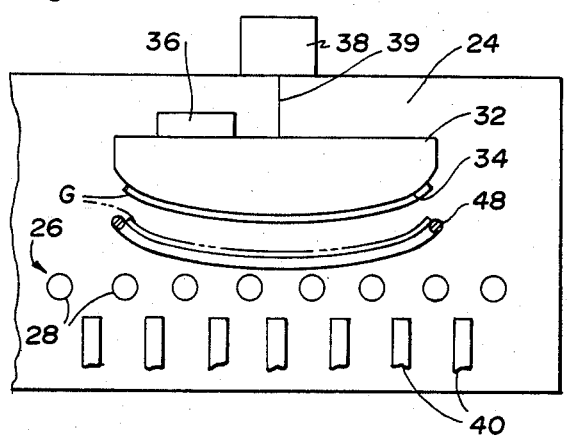
FIG. 14 is a schematic view taken in the same direction as FIG. 13 after the lower mold has been moved out from under the upper mold to permit the transfer mold to be moved thereunder as illustrated to receive the bent glass sheet as shown by phantom line representation.

As illustrated in FIG. 12, actuator 38 moves the upper mold 32 downwardly with the heated glass sheet supported thereby to provide the initial press bending between the upper mold and the first portion 60 of the lower mold 42. Thereafter, the actuator connections 66 move the second mold portion 62 of the lower mold 42 with respect to the first mold portion 60 by pivoting thereof about pivots 68 so as to further press bend the glass sheet as illustrated in FIG. 13. The upper mold 32 is then moved upwardly by actuator 38 and the lower mold is moved out from under the upper mold as the transfer mold 48 is moved thereunder as illustrated in FIG. 14 to receive the heated glass sheet as shown by phantom line representation to provide delivery of the bent glass sheet for cooling.

Both embodiments of the bending station 30c and 30d illustrated in FIGS. 8 and 9 are utilized with a press bending system that incorporates a quench station 54 to which the transfer mold 48 moves the bent glass sheet for tempering in the same manner as the previously described embodiments. This quench station 54 includes upper and lower blastheads 56 and 58 between which the transfer ring 48 positions the bent glass sheet for impingement by the quenching gas on the opposite glass surfaces as also was previously described. Furthermore, the quench station 54 is located on the opposite side of the conveyor 26 and upper mold 32 as the lower mold 42 in its first position shown by solid line representation in FIGS. 8 and 9. Thus, the lower mold 42 and the transfer mold 48 move in opposite directions upon movement into position below the upper mold 32 at the different stages of the press bending cycle.

As best illustrated in FIGS. 5, 6, 11, 12, 13, and 15, each embodiment of the press bending system includes adjustable stops 70 that limit the movement of the upper and lower molds 32 and 42 toward each other. In the embodiment shown in FIGS. 5 and 6, the adjustable stops 70 are mounted on the lower mold 42 of the fixed curvature. In the embodiment of FIGS. 11-13, the adjustable stops are provided on both the first and second portions 60 and 62 of the lower mold 42. With each embodiment, the adjustable stops 70 are located outside the periphery of the glass sheet so as not to interfere with the bending.

Figure 15:
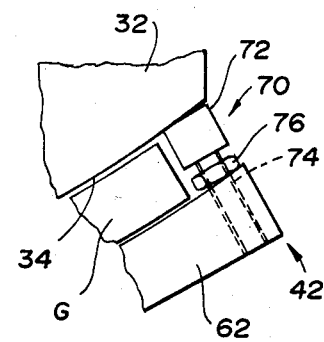
FIG. 15 is a partial view that illustrates the construction of an adjustable stop used in each embodiment of the press bending system.

The construction of the adjustable stops is illustrated in FIG. 15 as including a stop member 72 having a threaded shank 74 threaded into a hole in the associated lower mold. A lock nut 76 also received by the shank 74 is threaded against the lower mold in any adjusted position of the stop member 72 to control the spaced relationship between the upper mold 32 and the lower mold 42 during the bending. The adjustable stops 70 associated with the lower mold 42 of the FIGS. 5 and 6 embodiment and with the first mold portion 60 of the lower mold 42 in the FIGS. 11-13 embodiment prevent the associated actuator 38 from exerting excessive compressive force to the glass sheet during the bending. The adjustable stops 70 associated with the pair of second mold portions 62 of the lower mold 42 shown in FIGS. 11-13 prevent the actuator connections 66 shown in FIG. 13 from exerting excessive compressive force on the glass sheet during the completion of the press bending. While the adjustable stops 70 are illustrated in each embodiment as being mounted on the lower mold 42, which is preferred to permit ease of adjustment, it is also possible to mount the adjustable stops on the upper mold 32. Furthermore, the actuator 64 (FIGS. 8 and 9) that moves the second mold portion 62 of the lower mold 42 in the FIGS. 11-13 embodiment is preferably adjustable in order to control the movement of the second mold portion with respect to the first mold portion in terms of the speed and/or force that is exerted as the associated stops 70 are moved to the engaged relationship shown in FIG. 15.

The gas jet pump 38 is controlled to initially draw a sufficient vacuum to lift the glass sheet from the conveyor in cooperation with the upward gas flow from gas jet pumps 40. Thereafter, the level of the vacuum is reduced to prevent undesired deformation of the glass sheet, such as at holes in the upper mold surface 34 through which the vacuum is drawn. During the press bending, the vacuum can be terminated or reduced to prevent undesired deformation and can also be increased as necessary to assist in the bending. This further control of gas jet pump 38 can be performed in different steps as necessary during the bending to provide best results in assisting bending while preventing unnecessary deformation. Finally, the gas jet pump 38 provides positive pressure gas to the upper mold 32 to blow the bent glass sheet downwardly in cooperation with gravity onto the transfer mold 48.

The disclosures of all the aforementioned patents are hereby incorporated by reference into the disclosure of the present press bending system.

While the best modes for carrying out the invention have been described in detail, those familiar with the art to which this invention relates will recognize various alternative designs and embodiments for carrying out the invention as described by the following claims.

What is claimed is:

1. A glass sheet press bending system comprising: a furnace including a heating chamber for providing a heated ambient for heating glass sheets; a conveyor for conveying the heated glass sheets in a generally horizontally extending orientation; an upper mold located above the conveyer and having a downwardly facing curved shaped; means for supplying a differential gas pressure to a heated glass sheet on the conveyor below the upper mold to support the glass sheet against the downwardly facing curved shape of the upper mold at a location above the conveyor; a lower mold having an upwardly facing curved shaped and being mounted for horizontal movement at an elevation above the conveyor from a first position adjacent the upper mold to a second position below the upper mold and the heated glass sheet supported thereby; means for providing relative vertical movement between the upper and lower molds to press bend the heated glass sheet therebetween; and a transfer mold for receiving the bent glass sheet from the upper mold for horizontal movement therefrom for cooling.

2. A press bending system as in claim 1 wherein the upper mold is located within the heated ambient at a location above the conveyor, and the lower mold being located within the heated ambient in both the first and second positions thereof to thereby maintain the lower mold heated in order to reduce glass breakage during the press bending.

3. A press bending system as in claim 1 wherein the upper mold is located within the heated ambient at a location above the conveyor, the lower mold being located outside of the heated ambient in the first position to provide cooling thereof, and the lower mold being movable into the heated ambient upon movement to the second position below the upper mold where the press bending is performed without marking the glass sheet due to the cooled condition of the lower mold.

4. A press bending system as in claim 1, 2 or 3 wherein the lower mold has a fixed curved shape for press bending the heated glass sheet against the upper mold.

5. A press bending system as in claim 4 further including an adjustable stop for limiting movement of the upper and lower molds toward each other.

6. A press bending system as in claim 4 further including a quench station to which the transfer mold moves the bent glass sheet for tempering.

7. A press bending system as in claim 6 wherein the lower mold in the first position thereof and the quench station are located on opposite sides of the conveyor.

8. A press bending system as in claim 1, 2 or 3 wherein the lower mold includes first and second mold portions movable with respect to each other, the first mold portion of the lower mold initially pressing the heated glass sheet against the upper mold, and an actuator that subsequently moves the second mold portion of the lower mold with respect to the first mold portion thereof to complete the press bending of the heated glass sheet against the upper mold.

9. A press bending system as in claim 8 wherein the lower mold includes a pair of the second mold portions located on opposite sides of the first mold portion.

10. A press bending system as in claim 8 wherein the actuator that moves the second mold portion of the lower mold is located outside of the heated ambient.

11. A press beinding system as in claim 8 further including a quench station to which the transfer mold moves the bent glass sheet for tempering.

12. A press bending system as in claim 11 wherein the lower mold in the first position thereof and the quench station are located on opposite sides of the conveyor.

13. A press bending system as in claim 8 further including adjustable stops for respectively limiting the movement of the first and second portions of the lower mold toward the upper mold during the initial pressing and the completion of the press bending of the heated glass sheet.

14. A press bending system as in claim 8 wherein the actuator is adjustable to control the movement of the second mold portion with respect to the first mold portion.

15. A press bending system as in claim 1, 2 or 3 wherein the upper mold includes a downwardly facing curved surface, a gas jet pump for drawing a vacuum at the downwardly facing curved surface of the upper mold to provide at least some of the differential gas pressure that initially supports the heated glass sheet received thereby from the conveyor, and a control for controlling the extent of the vacuum drawn to reduce undesired deformation of the heated glass sheet.

16. A press bending system as in claim 4 wherein the control for the gas jet pump operates to: (a) initially draw a vacuum during lifting of the glass sheet from the conveyor to the upper mold; (b) thereafter reduce the vacuum to prevent undesired deformation with the glass sheet supported against the upper mold; (c) subsequently further control the vacuum as necessary during the press bending of the glass sheet between the upper and lower molds to assist in the bending while preventing undesired deformation as the press bending is performed; and (d) finally providing positive pressure gas to the upper mold to blow the bent glass sheet away from the upper mold.

17. A glass sheet press bending system comprising: a furnace including a heating chamber for providing a heated ambient for heating glass sheets; a roller conveyor for conveying the heated glass sheets in a generally horizontally extending orientation; an upper mold located within the heating chamber above the conveyor and having a downwardly facing curved shape; a gas jet pump for supplying a differential gas pressure to a heated glass sheet on the conveyor below the upper mold to support the glass sheet against the downwardly facing curved shape of the upper mold at a location above the conveyor; a lower mold having an upwardly facing curved shape and being mounted for horizontal movement at an elevation above the conveyor from a first position at one side of the upper mold to a second position below the upper mold and the heated glass sheet supported thereby; an actuator for moving the upper mold downwardly to press bend the heated glass sheet between the upper and lower molds; a transfer mold for receiving the bent glass sheet from the upper mold for horizontal movement therefrom for cooling; and a quench station located on the opposite side of the upper mold from the lower mold in the first position thereof and having upper and lower blastheads between which the transfer mold positions the bent glass sheet for tempering.

18. A glass sheet press bending system comprising: a furnace including a heating chamber for providing a heated ambient for heating glass sheets; a conveyor for conveying the heated glass sheets in a generally horizontally extending orientation; an upper mold located within the heating chamber above the conveyor and having a downwardly facing curved shape; a gas jet pump for supplying a differential gas pressure to a heated glass sheet on the conveyor below the upper mold to support the glass sheet against the downwardly facing curved shape of the upper mold at a location above the conveyor; a lower mold movable horizontally within the heating chamber and having a fixed shape that is curved in an upward direction complementary to the shape of the upper mold; an actuator for moving the lower mold horizontally at an elevation above the conveyor from a first position at one side of the upper mold to a second position below the upper mold and the heated glass sheet supported thereby; an actuator for moving the upper mold downwardly to press bend the heated glass sheet between the upper and lower molds; a transfer mold for receiving the bent glass sheet from the upper mold for horizontal movement therefrom; and a quench station located on the opposite side of the upper mold from the lower mold in the first position thereof and having upper and lower blastheads between which the transfer mold positions the bent glass sheet for tempering.

19. A glass sheet press bending system comprising: a furnace including a heating chamber for providing a heated ambient for heating glass sheets; a conveyor for conveying the heated glass sheets in a generally horizontally extending orientation; an upper mold located above the conveyor and having a downwardly facing curved shaped; a gas jet pump for supplying a differential gas pressure to a heated glass sheet on the conveyor below the upper mold to support the glass sheet against the downwardly facing curved shape of the upper mold at a location above the conveyor; a lower mold movable horizontally into and out of the heating chamber from one side thereof and having a fixed shape that is curved in an upward direction complementary to the shape of the upper mold; an actuator for moving the lower mold horizontally at an elevation above the conveyor from a first position outside of the heating chamber at the one side thereof to a second position within the heating chamber below the upper mold and the heated glass sheet supported thereby; an actuator for moving the upper mold downwardly to press bend the heated glass sheet between the upper and lower molds; a transfer mold for receiving the bent glass sheet from the upper mold for horizontal movement therefrom; a quench station located externally of the heating chamber on the opposite side thereof as the lower mold in the first position thereof; and the quench station having upper and lower blastheads between which the transfer mold positions the bent glass sheet for tempering.

20. A glass sheet press bending system comprising: a furnace including a heating chamber for providing a heated ambient for heating glass sheets; a conveyor for conveying the heated glass sheets in a generally horizontally extending orientation; an upper mold located within the heating chamber above the conveyor and having a downwardly facing curved shape; a gas jet pump for supplying a differential gas pressure to a heated glass sheet on the conveyor below the upper mold to support the glass sheet against the downwardly facing curved shape of the upper mold at a location above the conveyor; a lower mold movable horizontally within the heating chamber and having first and second curved portions movable with respect to each other; an actuator for moving the lower mold horizontally at an elevation above the conveyor from a first position at one side of the upper mold to a second position below the upper mold and the heated glass sheet supported thereby; an actuator for moving the upper mold downwardly to press bend the heated glass sheet between the upper mold and the first curved portion of the lower mold; an actuator for thereafter moving the second curved portion of the lower mold relative to the first curved portion thereof to further press bend the glass sheet between the upper and lower molds; a transfer mold for receiving the bent glass sheet from the upper mold for horizontal movement therefrom for cooling; and a quench station located on the opposite side of the upper mold from the lower mold in the first position thereof and having upper and lower blastheads between which the transfer mold positions the bent glass sheet for tempering.

21. A glass sheet press bending system comprising: a furnace including a heating chamber for providing a heated ambient for heating glass sheets; a conveyor for conveying the heated glass sheets in a generally horizontally extending orientation; an upper mold located within the heating chamber above the conveyor and having a downwardly facing curved shape; a gas jet pump for supplying a differential gas pressure to a heated glass sheet on the conveyor below the upper mold to support the glass sheet against the downwardly facing curved shape of the upper mold at a location above the conveyor; a lower mold movable horizontally into and out of the heating chamber from one side thereof and having first and second curved portions movable with respect to each other; an actuator for moving the lower mold horizontally at an elevation above the conveyor from a first position at the one side of the heating chamber to a second position below the upper mold and the heated glass sheet supported thereby; an actuator for moving the upper mold downwardly to press bend the heated glass sheet between the upper mold and the first curved portion of the lower mold; an acutator for thereafter moving the second curved portion of the lower mold relative to the first curved portion thereof to further press bend the glass sheet between the upper and lower molds; a transfer mold for receiving the bent glass sheet from the upper mold for horizontal movement therefrom for cooling; and a quench station located on the opposite side of the upper mold from the lower mold in the first position thereof and having upper and lower blastheads between which the transfer mold positions the bent glass sheet for tempering.

* * * * *

UNITED STATES PATENT AND TRADEMARK OFFICE
CERTIFICATE OF CORRECTION

PATENT NO. : 4,661,141

DATED : April 28, 1987

INVENTOR(S) : Dean M. Nitschke et al.

It is certified that error appears in the above-identified patent and that said Letters Patent is hereby corrected as shown below:

Column 5, line 38, after "sheet" insert -- press --.
Column 7, line 7, "head" should read -- heated --.
Column 8, line 51, "heating" should read -- heated --.
Column 10, line 55, "conveyer" should read -- conveyor --.
Column 10, line 56, "shaped" should read -- shape --.
Column 10, line 61, "shaped" should read -- shape --.
Column 11, line 47, "beinding" should read -- bending --.
Column 12, line 4, "4" should read -- 15 --.
Column 13, line 9, "shaped" should read -- shape --.
Column 14, line 38, "acutator" should read -- actuator --.

Signed and Sealed this

Sixteenth Day of August, 1988

Attest:

DONALD J. QUIGG

*Attesting Officer*  *Commissioner of Patents and Trademarks*